July 8, 1952  G. G. GREEN  2,602,639
ROCK DRILL BIT
Filed July 19, 1948
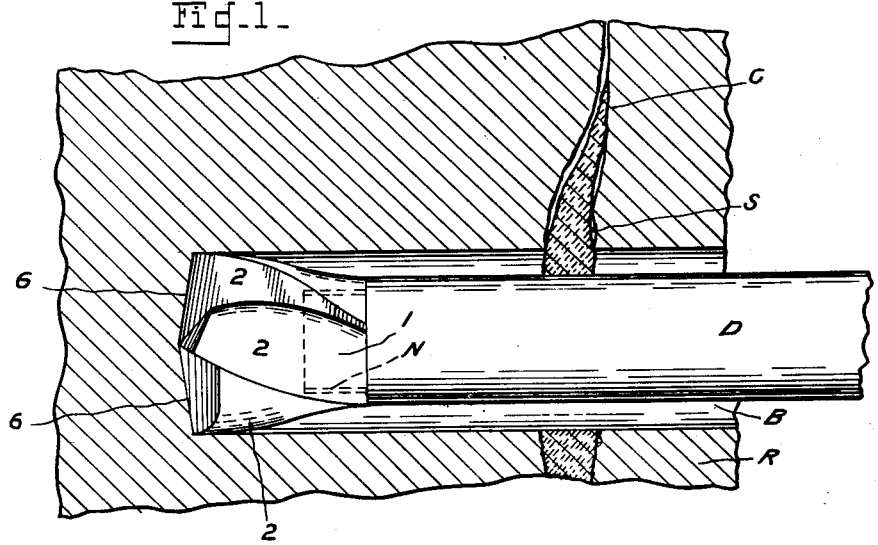
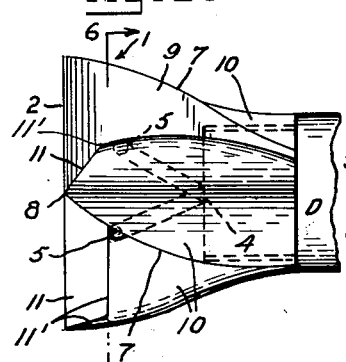
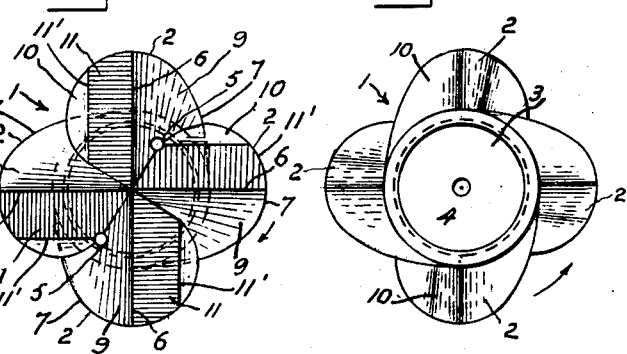
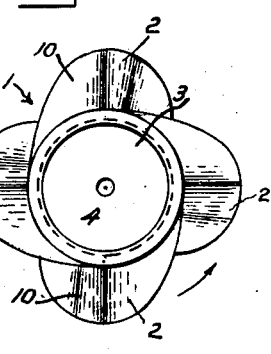
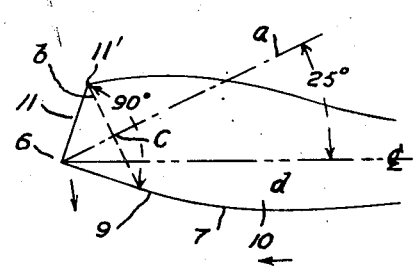
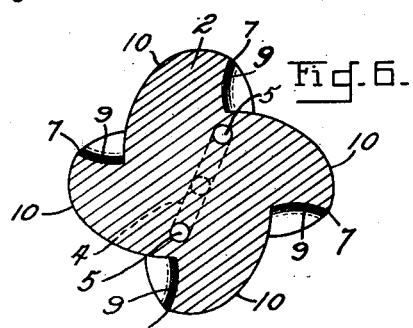
INVENTOR.
Gwylam G Green
BY
Attorney Patented July 8, 1952

2,602,639

UNITED STATES PATENT OFFICE 2,602,639

ROCK DRILL BIT

Gwylam G. Green, Pendleton, Oreg.

Application July 19, 1948, Serial No. 39,423

4 Claims. (Cl. 255—61)

This invention relates to rock drill bits and more particularly to a self-extracting bit, especially for use with jack-hammers.

When drilling into rock, it occasionally happens that seams in the rock extend transversely of the bore of the drill hole and that shale or sections of rock drop from the seams into the bore behind the drill bit. When this occurs it frequently happens that the drill bit cannot be withdrawn because the shale or rock sections become jammed and cannot be lifted or biased back up into the seams.

Consequently, considerable time is wasted in endeavoring to remove the drill bit and frequently the bit is broken or must be removed from the drill and abandoned. This difficulty is due to the fact that prior art drill bits are not capable of cutting in both forward and rearward directions.

The prior art bits have also been defective, with respect to maximum drilling efficiency, because the blades have not been designed to provide maximum cutting ability and maximum strength.

Having in mind the defects of the prior art bits, it is an object of the present invention to provide a rock drill bit that is self-extracting and is capable of boring outwardly, or in reverse, as well as inwardly or forwardly.

It is another object of the invention to provide a rock drill bit having blades with cutting edges which are formed to provide maximum strength and prevent breaking or chipping of the edges.

It is a further object of the invention to provide a rock drill bit having blades which are formed so that their cutting edges have maximum cutting ability.

It is a still further object of the invention to provide a rock drill bit that has simplicity of design or organization, economy of construction and efficiency in operation.

The foregoing objects, and others ancillary thereto, are preferably accomplished, according to a preferred embodiment of the invention, by a rock drill bit having blades, preferably rather thick blades, that have radial cutting edges on their forward ends, in the usual manner, and also have longitudinal cutting edges extending from the outer ends of the radial cutting edges to the rear end of the bit. The longitudinal cutting edges taper inwardly toward the rear end of the bit which is reduced in diameter to coincide with the diameter of the drill or jack-hammer shaft. Consequently, the rear end of the bit, and of the cutting edges, will readily slide under any shale or rock that has dropped down behind the bit and thereby enable the longitudinal cutting edges to engage the rock for cutting back through it.

Each of the blades has a longitudinally convex leading surface and the leading surface inclines backwardly to its forward radial edge to form the front surface of the radial edge without bevelling, whereas the trailing surface has a relatively deep bevel to form the rear surface of the forward radial edge. This formation provides a continuous longitudinal edge on the leading side of the blade from the forward edge to the rear end of the bit and which is capable of cutting through rock in back of the bit. Furthermore, this design of the blades facilitates a formation of the forward edges that is superior from the standpoint of strength and cutting ability, as it permits the formation of the edges at 90 degrees and the angulation of the edges at a striking angle of about 25 degrees.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, wherein like reference characters indicate like parts throughout the several figures and in which:

Fig. 1 is a cross-sectional view axially through a drill hole bored into rock and showing a side view of the bit of the present invention and attached to the shaft of a drill or jack-hammer;

Fig. 2 is a side view of a modified form of bit;

Fig. 3 is a front view of the bit;

Fig. 4 is a rear view of the bit;

Fig. 5 is a diagrammatic view of a blade illustrating the angles of the front edge thereof, and Figure 6 is a cross-sectional view corresponding to line 6—6 of Figure 2.

Referring to the drawing, specifically to Fig. 1, it will be seen that the drill bit 1, having blades 2, may be attached to the drill shaft D of a drill or jack-hammer in the usual manner, as by means of a threaded socket 3 which is adapted for removable mounting on a nipple N on the end of the shaft D. The bit 1 may be provided with the usual air or water passages 4 and flushing outlets 5 which are adapted for communication with the usual air or water passage, not shown, extending through the shaft D. The bit 1 may be employed in the usual manner, striking and turning, for drilling a bore B into rock R, it being rotated counter-clockwise, as shown by the arrows in Figs. 3 and 4, when viewed from the rear or shaft end.

It frequently happens that the bore B will pass through a seam or crack C in the rock R, and, after the bit 1 has passed the crack C, a slab of rock or shale S will drop down from the crack against the drill shaft D and block the bore B. When this happens, the slab S blocks the withdrawal of the bit 1 and, frequently, it is impossible to lift the slab S back up into the crack C because of the rough, irregular surfaces of both the crack C and the slab S. When this occurs, it very often happens that the bit must be abandoned and a new bore drilled. In any event, the bit, very often, is damaged and beyond use even if it is extracted.

In order to overcome these difficulties, the bit 1, according to the present invention, is provided with blades 2 having dual operating edges so that the bit is capable of reaming its way rearwardly as well as cutting forwardly. Although a bit having four blades 2 is shown, it is obvious that any desired number may be incorporated with the bit. Each of the blades 2 comprises a forward radial edge 6 for cutting a bore B into the rock R, and a longitudinal edge 7 for reaming back through the shale S. The radial edges 6 of the blades 2 may be very slightly inclined toward their axial joint to form a slight point 8 to effect centering, as shown in Fig. 1, or the edges 6 may lie in a diametrically transverse plane to afford greater strength, as shown in Fig. 2. A pointed bit, as shown in Fig. 1, has the advantage of being more readily centered and when the point is very slight, the bit is not materially weakened.

The blades 2 are flared outwardly from their rear or shaft end to their forward or cutting end, and they are thick to provide strength for both the radial cutting edges 6 and the longitudinal reaming edges 7. The blades 2 each comprise three surfaces: A substantially radial leading surface 9 which extends the height of the blade; a substantially circumferential trailing surface 10 that extends both the width and the height of the blade and longitudinally joining the leading surface 9 to form the longitudinal reaming edge 7; and a bevel surface 11 between the front edges of the leading and trailing surfaces. At its forward end, the trailing surface 10 terminates in an edge 11' at the juncture with the beveled surface 11 and the latter surface extends to the forward end of the leading surface 9 to cooperatively form the forward radial cutting edge 6. Thus, there is only one bevel to be sharpened when the edge 6 becomes too dull for efficient use.

The leading surface 9, as shown in Figure 3, is radial of the bit at its front end and, as shown in Figures 1 and 2, extends to the rear end of the bit to a position disposed clockwise relative to its front end. The leading surface 9 is somewhat convex longitudinally and is slightly twisted clockwise to accommodate the circumferential displacement between its front and rear ends. Transversely, this surface is very slightly concave but almost flat, as best shown in Figure 6. The trailing surface 10 is convex both longitudinally, as best shown in Fig. 2, and transversely and extends from the top longitudinal edge of the leading surface 9 to the opposite base of the blade, as best shown in Figure 6. The junction of the leading surface 9 and the trailing surface 10 is substantially at right angles, as shown in Figure 6, and forms the longitudinal reaming edges 7.

The outer circumference of the bit is formed by a portion of the trailing surface 10 that is adjacent the longitudinal edge 7 and therefore provides the edge 7 with maximum strength. Due to this formation, the longitudinal edge 7 is practically self-sharpening because the wear is primarily incident on the trailing surface 10 adjacent the longitudinal edge 7, as best shown in Figure 6, due to the turning of the bit. From the circumferential portion, the trailing surface curves inwardly of the bit to the next succeeding blade 2 to join and define the inner edge of the leading surface 9 of said next blade. This formation provides a thick blade, particularly at its base or root, which has greater strength and is less liable to be damaged.

The blades 2 are also formed so as to provide the forward cutting edge 6 with maximum efficiency and strength, as best illustrated in Fig. 5. The front portion of the leading surface 9 is substantially flat and this front portion of the surface 9 and the bevel 11 are arranged at substantially 90° as this is the strongest angle for the edge 6 so that it is less apt to break.

In order to further increase the strength of the edge 6, the edge forming portion, between the flat front portion of the surface 9 and the bevel surface 11, extends well back on the blade 2 on a plane $a$ which bisects the angle of the edge 6. A plane $b$ extending at 45° to the bevel surface 11 and the surface 9, from the junction between the bevel surface 11 and the surface 10, forms the hypotenuse of a 45° right angle triangle, of which the bevel surface 11 and front portion of the surface 9 are the right angle faces, and the intersection $c$ of plane $a$ and hypotenuse $b$ should be spaced from the edge 6 a distance of ¾ of an inch.

Furthermore, in order to increase the cutting efficiency of the edge 6 and to provide self-sharpening to a degree, the edge forming portion is positioned at an angle to the axis of the bit, and, consequently, to the working surface of the rock. The portion forming the edge 6 is positioned so that its bisecting line $a$ lies at an angle of substantially 25° relative to the axis $d$ of the bit 1 and is tilted to face toward the direction of rotation of the bit so that the blade, in operation, turns and strikes in the same direction.

In operation, the bit 1 is attached to the drill or jack-hammer shaft D in the usual manner and employed in the usual manner for cutting a bore B into the rock R by the forward radial cutting edges 6. In the event that the bore B passes through a seam or crack C in the rock R and shale or slabs of rock S drop down against the jack-hammer shaft D behind the bit 1, the bit 1 may readily be removed from the bore B by pulling outward on the shaft D until the longitudinal cutting edges 7 engage and cut through the slab S. As the rear end of the bit 1 has a circumference not greater than that of the shaft D, it will easily slide under and against the rock slab S.

Although certain specific embodiments of the invention have been shown and described, it is obvious that many modifications thereof are possible. The invention, therefore, is not to be restricted except in so far as is necessitated by the prior art and by the spirit of the appended claims.

That which is claimed, as new, is:

1. A rock drill bit comprising a body, means at the rear end of said body for removably attaching said body to the end of a drill shaft, the rear end portion of said body having a circumference not greater than that of the drill shaft, a plurality of blades on said body and extending substantially radially thereof, said blades extending the length of said body and curving outwardly from the rear end thereof to extend beyond the circumference of the drill shaft, each of said blades having a leading surface, a trailing surface and a beveled surface, said leading surface being substantially radial of said body and convex longitudinally from a front edge portion that is radial of the body axis to a rear edge portion disposed clockwise of said body from the front edge, said trailing surface being curved circumferentially and extending from the rear base of the blade at the body and longitudinally intersecting said leading surface to form with said leading surface a longitudinal reamer, and said beveled surface extending from the forward edge of said trailing surface to the forward edge of said leading surface to form therewith a forward radial cutting edge.

2. A rock drill bit comprising a body, means at the rear end of said body for removably attaching said body to the end of a drill shaft, the rear end portion of said body having a circumference not greater than that of the drill shaft, a plurality of blades on said body and extending substantially radially thereof, said blades extending the length of said body and curving outwardly from the rear end thereof to extend beyond the circumference of the drill shaft, each of said blades having a leading surface, a trailing surface and a beveled surface, said leading surface being substantially flat but slightly concave radially of said body and being convex longitudinally from a front edge portion that is radial of the body axis to a rear edge portion disposed clockwise of said body from the front edge, said trailing surface being curved circumferentially and extending from the rear base of the blade at the body and longitudinally intersecting said leading surface to form with said leading surface a longitudinal reamer, the portion of said trailing surface adjacent said longitudinal reamer being substantially cylindrical and coincident with the circumference of the bit and at substantially right angles to said leading surface to provide a strong longitudinal self-sharpening reamer edge, and said beveled surface extending from the forward edge of said trailing surface to the forward edge of said leading surface to form therewith a forward radial cutting edge.

3. A rock drill bit comprising a body, means at the rear end of said body for removably attaching said body to the end of a drill shaft, the rear end portion of said body having a circumference not greater than that of the drill shaft, a plurality of blades on said body and extending substantially radially thereof, said blades extending the length of said body and curving outwardly from the rear end thereof to extend beyond the circumference of the drill shaft, each of said blades having a leading surface, a trailing surface and a beveled surface, said leading surface being substantially flat but slightly concave radially of said body and being convex longitudinally from a front edge portion that is radial of the body axis to a rear edge portion disposed clockwise of said body from the front edge, said trailing surface being curved circumferentially and extending from the rear base of the blade at the body and longitudinally intersecting said leading surface to form with said leading surface a longitudinal reamer, the portion of said trailing surface adjacent said longitudinal reamer being substantially cylindrical and coincident with the circumference of the bit and at substantially right angles to said leading surface to provide a strong longitudinal reamer edge, and said beveled surface extending from the forward edge of said trailing surface to the forward edge of said leading surface to form therewith a forward radial cutting edge, said radial cutting edge being tilted toward its turning and striking direction, so that a plane bisecting the angle of said edge is tilted relative to the axis of said body, said beveled surface and the forward portion of the leading surface being positioned at right angles relative to each other to provide the edge with strength.

4. A rock drill bit comprising a body, a plurality of blades on said body and extending substantially radially thereof, each of said blades having a leading surface, a trailing surface, and a beveled surface, said leading surface having a front edge portion that is radial of the body axis, said leading and trailing surfaces extending longitudinally of the blade, and said beveled surface extending from the forward edge of said trailing surface to the radial forward edge of said leading surface to form therewith a forward radial cutting edge, said radial cutting edge being tilted toward its turning and striking direction, so that a plane bisecting the angle of said edge is tilted relative to the axis of said body.

GWYLAM G. GREEN.

REFERENCES CITED

The following references are of record in the file of this patent:

UNITED STATES PATENTS

| Number | Name | Date |
| --- | --- | --- |
| Re. 20,468 | Brenholm | Aug. 17, 1937 |
| 291,568 | Borchardt | Jan. 8, 1884 |
| 658,060 | Dudley | Sept. 18, 1900 |
| 991,830 | Clements | May 19, 1911 |
| 1,727,752 | Decker | Sept. 10, 1929 |
| 1,746,046 | McIntosh | Feb. 4, 1930 |
| 2,101,566 | Vanderpool | Dec. 7, 1937 |
| 2,179,689 | Earnheart | Nov. 14, 1939 |
| 2,183,466 | Rawlings | Dec. 12, 1939 |
| 2,294,004 | Serafino | Aug. 25, 1942 |
| 2,499,282 | Roberts | Feb. 28, 1950 |